No. 609,570. Patented Aug. 23, 1898.
E. M. BOWDEN.
MECHANISM FOR TRANSMITTING MOTION OR POWER.
(Application filed Nov. 29, 1897.)

(No Model.) 2 Sheets—Sheet 1.

WITNESSES:

INVENTOR.
Ernest Mennington Bowden.
Per Robert E. Phillips.
Attorney.

UNITED STATES PATENT OFFICE.

ERNEST M. BOWDEN, OF LONDON, ENGLAND.

MECHANISM FOR TRANSMITTING MOTION OR POWER.

SPECIFICATION forming part of Letters Patent No. 609,570, dated August 23, 1898.

Application filed November 29, 1897. Serial No. 660,145. (No model.) Patented in England November 11, 1896, No. 25,325; in France April 23, 1897, No. 266,250, and in Belgium April 26, 1897, No. 127,847.

*To all whom it may concern:*

Be it known that I, ERNEST MONNINGTON BOWDEN, a subject of the Queen of Great Britain, residing at 9 Fopstone road, Earls Court, London, in the county of Middlesex, England, have invented a new and Improved Mechanism for the Transmission of Motion or Power, (for which I have obtained Letters Patent in Great Britain, No. 25,325, and bearing date November 11, 1896; in France, No. 266,250, dated April 23, 1897, and in Belgium, No. 127,847, dated April 26, 1897,) of which the following is a specification.

This invention relates to mechanism for transmitting power and motion; and it consists in the novel construction and combination of the parts hereinafter fully described and claimed.

Figure 1:
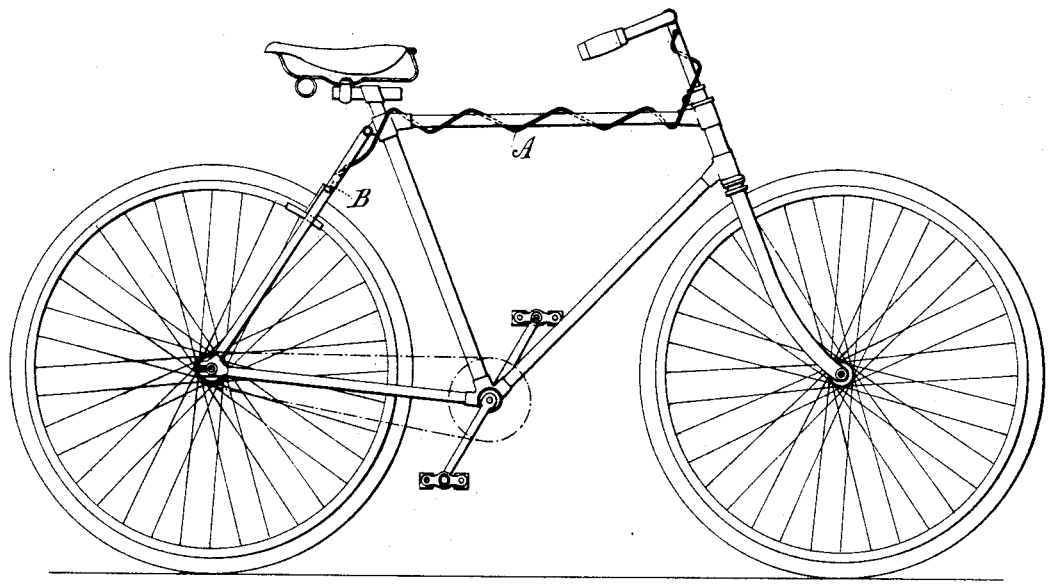
Figure 2:
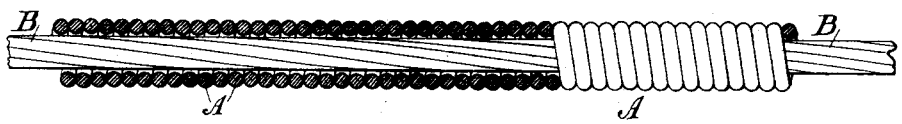
Figure 3:
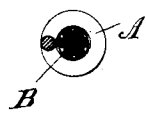
Figure 3:
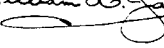
Figure 4:
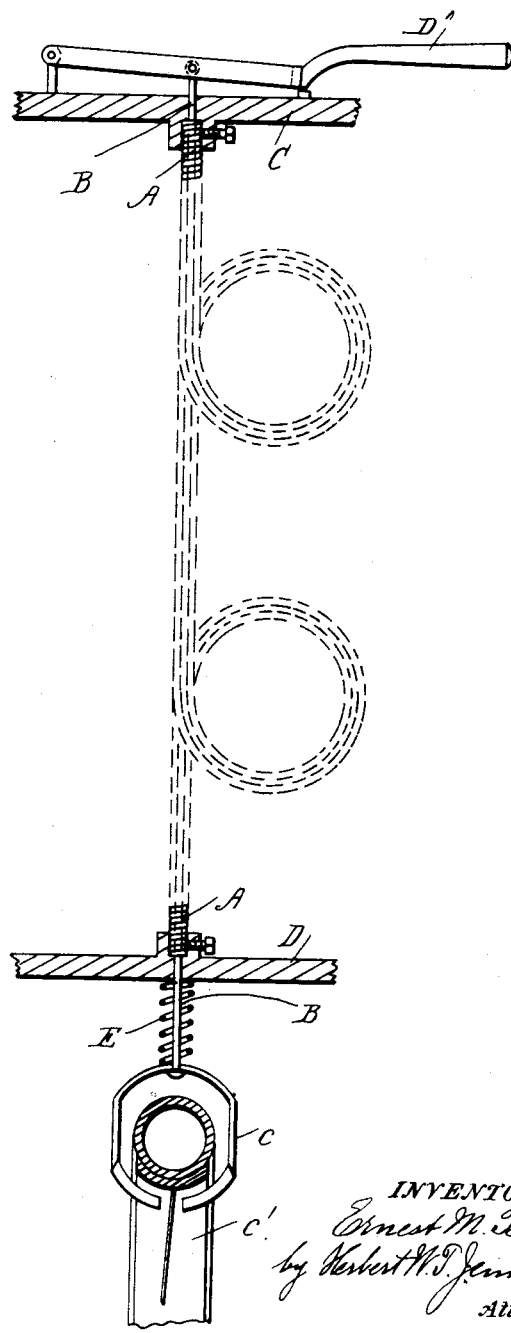

In the drawings, Figure 1 is a side view of a bicycle, showing one application of this invention. Fig. 2 is a side view of the transmitting device, partly in section. Fig. 3 is a cross-section through the transmitting device. Fig. 4 is a diagram showing one application of the invention.

A is a tortuous guide-tube formed of spirally-coiled wire. The coils are arranged close to each other, so that the guide is incompressible longitudinally; but it may be bent in any direction laterally.

B is a tortuous rod which is free to slide longitudinally within the guide A. The rod B is preferably formed of twisted or stranded wires, so as to be very flexible and free to bend laterally and follow all the curves of the tubular guide when the said rod B is moved longitudinally, and the twist of the said wires is arranged so that the rod B is as equally non-extensible as a solid rod or wire. Both the rod and its guide are non-revoluble.

According to one application of this invention the ends of the guide A are rigidly secured to stationary abutments C and D, which may be portions of the frame of a bicycle. One end of the rod B is operatively connected with a brake c, which bears against the rim c' of the driving-wheel. The other end of the rod B is provided with a handle or lever D' for operating it.

The guide A and the rod B are looped around or supported by the frame of the bicycle, as indicated in Fig. 1, and they do not require to be arranged in a straight line. When the rod B is pulled by means of the handle, the brake is applied, the rod B being free to slide longitudinally within its tortuous guide and the said guide having sufficient lateral stability to permit the brake to be used effectively.

E is a spring which moves the rod back to its original position when the handle D is let go and thereby releases the wheel from the action of the brake.

What I claim is—

1. The combination, with a non-revoluble and tortuous guide, of a non-revoluble and tortuous member for transmitting power and motion said member being movable longitudinally with relation to its guide and having greater lateral flexibility than its guide, substantially as set forth.

2. The combination, with a tortuous non-revoluble guide, of a non-revoluble and tortuous rod slidable longitudinally in the said guide, substantially as set forth.

3. The combination, with a non-revoluble and tortuous guide-tube formed of coiled wire, of a non-revoluble and tortuous rod slidable longitudinally in the said tube, substantially as set forth.

4. The combination, with a non-revoluble and tortuous guide-tube formed of coiled wire, the coils of the wire being arranged close to each other; of a non-revoluble and tortuous rod formed of twisted wires and not extensible longitudinally, said rod being slidable longitudinally within the said tube, substantially as set forth.

5. The combination, with a non-revoluble and tortuous guide-tube formed of coiled wire, and stationary abutments having the ends of the said tube secured to them; of a non-revoluble and tortuous rod slidable longitudinally in the said tube, and a brake operatively connected to one end portion of the said rod, substantially as set forth.

ERNEST M. BOWDEN.

Witnesses:
A. MILWARD HACK,
FRED C. HARRIS.